(12) United States Patent
Hayashi

(10) Patent No.: US 8,246,514 B2
(45) Date of Patent: Aug. 21, 2012

(54) TRANSMISSION DEVICE, POWER OUTPUT DEVICE, AND CONTROL METHOD OF POWER OUTPUT DEVICE

(75) Inventor: Takafumi Hayashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 585 days.

(21) Appl. No.: 12/458,944

(22) Filed: Jul. 28, 2009

(65) Prior Publication Data

US 2010/0029439 A1 Feb. 4, 2010

Related U.S. Application Data

(60) Provisional application No. 61/129,981, filed on Aug. 4, 2008.

(30) Foreign Application Priority Data

Jul. 31, 2008 (JP) .................................. 2008-197862

(51) Int. Cl.
*B60W 10/04* (2006.01)
*B60W 10/10* (2012.01)

(52) U.S. Cl. ............................ 477/109; 477/83; 477/156

(58) Field of Classification Search .................... 477/70, 477/77, 83, 101, 109, 115, 156, 162, 181; 74/335

See application file for complete search history.

(56) References Cited

U.S. PATENT DOCUMENTS

| | | | |
|---|---|---|---|
| 2003/0163235 A1 | 8/2003 | Tokura et al. | |
| 2004/0192500 A1* | 9/2004 | Tokura et al. | 477/109 |
| 2008/0039284 A1 | 2/2008 | Asami et al. | |

FOREIGN PATENT DOCUMENTS

| | | |
|---|---|---|
| JP | A-10-184410 | 7/1998 |
| JP | A-2003-254427 | 9/2003 |
| JP | A-2004-44715 | 2/2004 |
| JP | A-2008-45567 | 2/2008 |
| JP | A-2008-51268 | 3/2008 |
| JP | A-2008-114803 | 5/2008 |
| JP | A-2008-169874 | 7/2008 |
| WO | WO 2007/049683 A1 | 5/2007 |
| WO | WO 2008/084683 A1 | 7/2008 |

* cited by examiner

*Primary Examiner* — Justin Holmes
(74) *Attorney, Agent, or Firm* — Oliff & Berridge, PLC

(57) ABSTRACT

A transmission device that is built into a power output device outputting power to a drive shaft in combination with a power source and that includes an automatic transmission that changes a shift speed by switching an engagement state of at least one friction engagement element and transmits power from the power source to the drive shaft, the transmission device includes an engagement pressure regulating device and a control unit.

11 Claims, 5 Drawing Sheets

FIG. 2

|  | C-1 | C-2 | C-3 | B-1 | B-2 | F-1 |
|---|---|---|---|---|---|---|
| P |  |  |  |  |  |  |
| REV |  |  | ○ |  | ○ |  |
| N |  |  |  |  |  |  |
| D 1st | ○ |  |  |  | ● | ○ |
| D 2nd | ○ |  |  | ○ |  |  |
| D 3rd | ○ |  | ○ |  |  |  |
| D 4th | ○ | ○ |  |  |  |  |
| D 5th |  | ○ | ○ |  |  |  |
| D 6th |  | ○ |  | ○ |  |  |

○: ENGAGED; ●: ENGAGED WHEN ENGINE BRAKE IS IN OPERATION

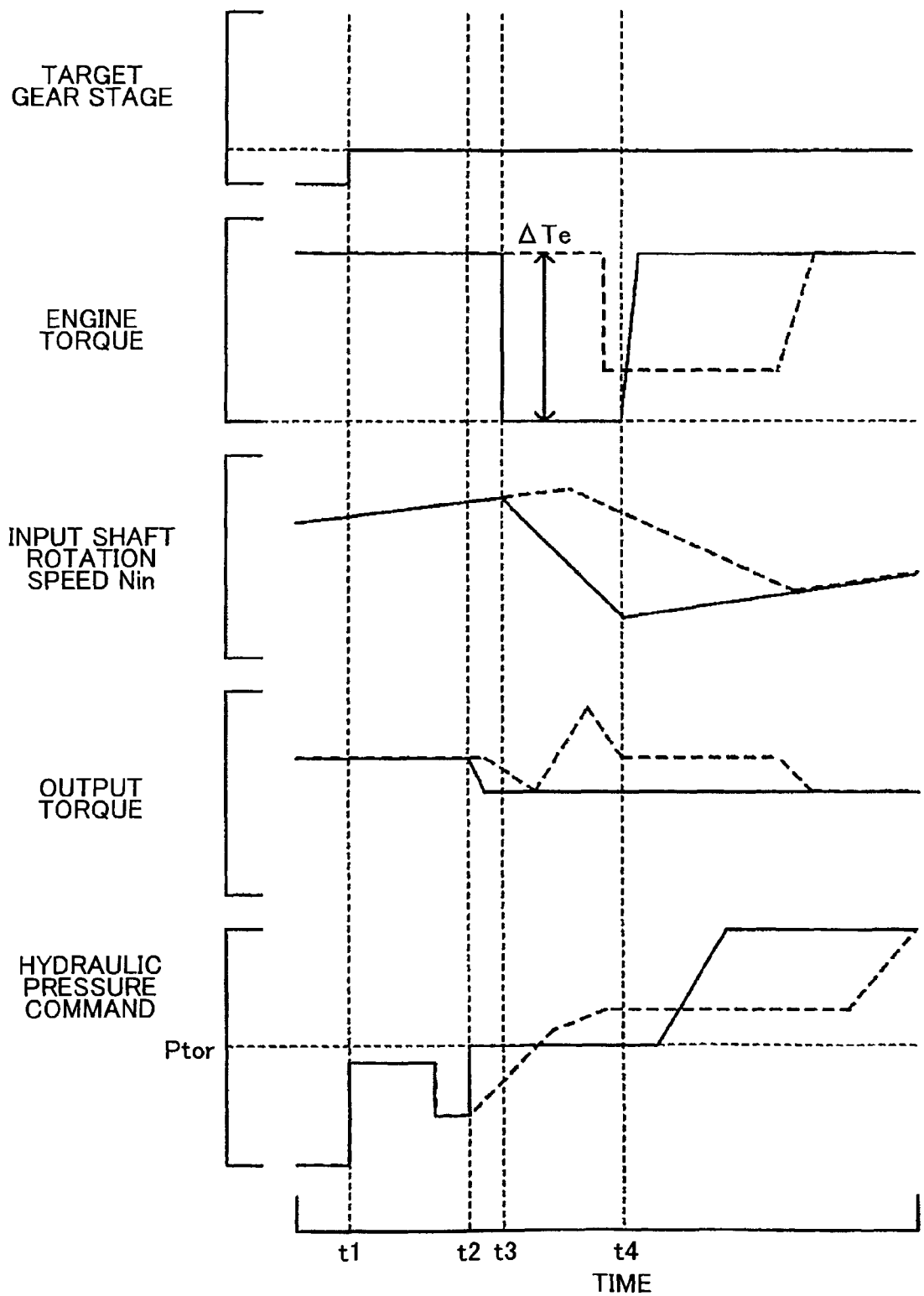

TRANSMISSION DEVICE, POWER OUTPUT DEVICE, AND CONTROL METHOD OF POWER OUTPUT DEVICE

CROSS-REFERENCE TO RELATED APPLICATIONS

The disclosure of Japanese Patent Application No. 2008-197862 filed on Jul. 31, 2008, and U.S. Provisional Patent Application No. 61/129,981 filed on Aug. 4, 2008, including the specification, drawings and abstract is incorporated herein by reference in its entirety.

BACKGROUND

The present invention relates to a transmission device, a power output device, and a control method of the power output device, and more particularly to a transmission device that is built into a power output device outputting power to a drive shaft in combination with a power source and that includes an automatic transmission that changes a shift speed by switching the engagement state of at least one friction engagement element and transmits power from the power source to the drive shaft, a power output device that outputs power to a drive shaft, and a control method of the power output device.

Conventionally, as a type of the power output device described above, there has been proposed a device in which, when an upshift command of an automatic transmission has been issued, the torque transmission capacity of a clutch (friction element) to be engaged is gradually increased, then a pre-torque down operation is performed for reducing the torque of an engine before starting an inertia phase, and after starting the inertia phase, the torque down operation of the engine is performed again, thereby changing the shift speed (refer to Patent Document 1, for example). It is stated that this device can not only suppress a shift shock but also reduce the heat load of the clutch by performing the pre-torque down of the engine before starting the inertia phase.

[Patent Document 1] Japanese Patent Application Publication No. JP-A-2008-51268

SUMMARY

In the case of the power output device described above, if the shift speed is changed through two phases of a torque phase and the inertia phase, the shift operation involves a drop in torque on an output shaft while the torque phase is being executed before starting the inertia phase. Consequently, the torque down operation of the engine in the torque phase further contributes to the drop in acceleration caused by the torque phase, resulting in deterioration in shift feeling. In addition, when changing the shift speed, it is generally considered to be an important issue not only to improve shift shock and shift feeling but also to change the shift speed quickly.

It is a main object of the present invention to provide a transmission device, a power output device, and a control method of the power output device that achieve a quick change of the shift speed while suppressing a shift shock.

In order to achieve the main object described above, the transmission device, the power output device, and the control method of the power output device of the present invention employ the means described below.

A transmission device according to a first aspect of the present invention that is built into a power output device outputting power to a drive shaft in combination with a power source and that includes an automatic transmission that changes a shift speed by switching the engagement state of at least one friction engagement element and transmits power from the power source to the drive shaft includes: an engagement pressure regulating device that regulates an engagement pressure of the friction engagement element; and a control unit that controls the power source and the engagement pressure regulating device when a change of the shift speed is performed by engaging the friction engagement element in the state in which a torque is acting on an input shaft of the automatic transmission, so that the change of the shift speed is performed through two phases of a torque phase in which transmission of torque is changed to be made at the shift speed after shifting and an inertia phase in which a rotation speed of the input shaft is changed to a rotation speed corresponding to the shift speed after shifting, and controlling the power source and the engagement pressure regulating device so that the torque phase is executed by standing by with the friction engagement element engaged with a slip at a predetermined engagement pressure and the inertia phase is executed by reducing the torque acting on the input shaft from the power source in the state of standing by at the predetermined engagement pressure.

In the above-described transmission device according to the first aspect of the present invention, when a change of the shift speed is performed by engaging the friction engagement element in the state in which a torque is acting on the input shaft of the automatic transmission, the power source and the engagement pressure regulating device are controlled so that the change of the shift speed is performed through the two phases of the torque phase in which transmission of torque is changed to be made at the shift speed after shifting and the inertia phase in which the rotation speed of the input shaft is changed to a rotation speed corresponding to the shift speed after shifting, and so that the torque phase is executed by standing by with the friction engagement element engaged with a slip at the predetermined engagement pressure and the inertia phase is executed by reducing the torque acting on the input shaft from the power source in the state of standing by at the predetermined engagement pressure. Consequently, the transmission device of the present invention can change the shift speed quickly while suppressing the shift shock associated with engagement of the friction engagement element, compared with a device that executes the inertia phase by increasing the pressure for engagement with a slip of the friction engagement element, or a device that reduces the torque acting on the input shaft from the power source in the torque phase. In addition, this device can suppress heat generation caused by friction of the friction engagement element associated with shifting. Here, the "friction engagement element" includes not only a clutch connecting two rotating systems but also a brake connecting one rotating system to a fixed system such as a case.

In the transmission device according to the first aspect of the present invention described above, the friction engagement element may be an element driven by fluid pressure, the engagement pressure regulating device may be a fluid pressure regulating device that regulates the fluid pressure to be applied to the friction engagement element, and the control unit may be a unit that controls the power source and the fluid pressure regulating device so that the torque phase is executed by standing by with a predetermined fluid pressure serving as the predetermined engagement pressure applied to the friction engagement element, and the inertia phase is executed by reducing the torque acting on the input shaft from the power source in the state of standing by at the predetermined fluid pressure.

In the transmission device of the present invention according to the first aspect of the present invention, the control unit may be a unit that controls the fluid pressure regulating device by setting a fluid pressure command to increase the pressure up to the predetermined fluid pressure in a stepwise manner so as to execute the torque phase. With this unit, the shift speed can be changed more quickly.

Also, in the transmission device of the present invention according to the first aspect of the present invention, the control unit may be a unit that controls the fluid pressure regulating device so that the state of standing by at the predetermined fluid pressure is maintained until the inertia phase terminates. With this unit, the shift shock can be further suppressed because the engagement pressure of the friction engagement element is maintained at a comparatively low pressure while the inertia phase is being executed.

In addition, in the transmission device of the present invention according to the first aspect of the present invention, the predetermined fluid pressure may be a fluid pressure at which the torque phase is completed but the inertia phase is not started. With this setting, the torque phase can be executed at a more appropriate fluid pressure, thereby enabling to further suppress the shift shock.

Moreover, the transmission device of the present invention according to the first aspect of the present invention may be structured so as to transmit the torque from the power source to the drive shaft by using reaction force received by the friction engagement element, and the predetermined fluid pressure in the transmission device may be a fluid pressure that is necessary and sufficient to receive the reaction force corresponding to the torque output from the power source. With this transmission device, the torque phase can be executed at a more appropriate fluid pressure, thereby enabling to further suppress the shift shock.

Furthermore, in the transmission device of the present invention according to the first aspect of the present invention, the control unit may be a unit that performs control so as to determine completion of the torque phase and start the inertia phase by reducing the torque acting on the input shaft at the timing when the completion of the torque phase is determined. With this unit, the timing to reduce the torque acting on the input shaft from the power source can be made more appropriate. In this case, in the transmission device of the present invention, the control unit may be a unit that determines the completion of the torque phase based on time elapsed after the control of the fluid pressure regulating device is started so that the predetermined fluid pressure is applied to the friction engagement element, or the control unit may be a unit that determines the completion of the torque phase based on a rotational acceleration of the input shaft of the automatic transmission or on a rotational acceleration of an output shaft of the automatic transmission. With this unit, the completion of the torque phase can be determined more appropriately.

A power output device according to a second aspect of the present invention, which outputs power to a drive shaft, includes: a power source; an automatic transmission that has at least one friction engagement element and an engagement pressure regulating device that regulates an engagement pressure of the friction engagement element, and that changes a shift speed by switching the engagement state of the friction engagement element and transmits power from the power source to the drive shaft; and a control unit that performs control when a change of the shift speed is performed by engaging the friction engagement element in the state in which a torque is acting on an input shaft of the automatic transmission, so that the change of the shift speed is performed through two phases of a torque phase in which transmission of torque is changed to be made at the shift speed after shifting and an inertia phase in which a rotation speed of the input shaft is changed to a rotation speed corresponding to the shift speed after shifting, and controlling the engagement pressure regulating device so that the torque phase is executed by standing by with the friction engagement element engaged with a slip at a predetermined engagement pressure and also controlling the power source so that the inertia phase is executed by reducing the torque acting on the input shaft from the power source in the state of standing by at the predetermined engagement pressure.

In the above-described power output device according to the second aspect of the present invention, when a change of the shift speed is performed by engaging the friction engagement element in the state in which a torque is acting on the input shaft of the automatic transmission, the control unit performs control so that the change of the shift speed is performed through the two phases of the torque phase in which transmission of torque is changed to be made at the shift speed after shifting and the inertia phase in which the rotation speed of the input shaft is changed to a rotation speed corresponding to the shift speed after shifting, and controls the engagement pressure regulating device so that the torque phase is executed by standing by with the friction engagement element engaged with a slip at the predetermined engagement pressure and also controls the power source so that the inertia phase is executed by reducing the torque acting on the input shaft from the power source in the state of standing by at the predetermined engagement pressure. Consequently, the power output device of the present invention can change the shift speed quickly while suppressing the shift shock associated with engagement of the friction engagement element, compared with a device that executes the inertia phase by increasing the pressure for engagement with a slip of the friction engagement element, or a device that reduces the torque acting on the input shaft from the power source in the torque phase. In addition, this device can suppress heat generation caused by friction of the friction engagement element associated with shifting.

According to a third aspect of the present invention, a control method of a power output device including a power source and an automatic transmission that has at least one friction engagement element and an engagement pressure regulating device that regulates an engagement pressure of the friction engagement element, and that changes a shift speed by switching the engagement state of the friction engagement element and transmits power from the power source to a drive shaft is characterized by including: performing control when a change of the shift speed is performed by engaging the friction engagement element in the state in which a torque is acting on an input shaft of the automatic transmission, so that the change of the shift speed is performed through two phases of a torque phase in which transmission of torque is changed to be made at the shift speed after shifting and an inertia phase in which a rotation speed of the input shaft is changed to a rotation speed corresponding to the shift speed after shifting; and controlling the engagement pressure regulating device so that the torque phase is executed by standing by with the friction engagement element engaged with a slip at a predetermined engagement pressure and also controlling the power source so that the inertia phase is executed by reducing the torque acting on the input shaft from the power source in the state of standing by at the predetermined engagement pressure.

With the above-described control method of the power output device according to the third aspect of the present invention, when a change of the shift speed is performed by engaging the friction engagement element in the state in which a torque is acting on the input shaft of the automatic transmission, the control method performs control so that the change of the shift speed is performed through the two phases of the torque phase in which transmission of torque is changed to be made at the shift speed after shifting and the inertia phase in which the rotation speed of the input shaft is changed to a rotation speed corresponding to the shift speed after shifting, and controls the engagement pressure regulating device so that the torque phase is executed by standing by with the friction engagement element engaged with a slip at the predetermined engagement pressure and also controls the power source so that the inertia phase is executed by reducing the torque acting on the input shaft from the power source in the state of standing by at the predetermined engagement pressure. Consequently, the control method of the power output device of the present invention can change the shift speed quickly while suppressing the shift shock associated with engagement of the friction engagement element, compared with a device that executes the inertia phase by increasing the pressure for engagement with a slip of the friction engagement element, or a device that reduces the torque acting on the input shaft from the power source in the torque phase. In addition, this method can suppress heat generation caused by friction of the friction engagement element associated with shifting.

BRIEF DESCRIPTION OF THE DRAWINGS

FIG. 2 is an explanatory diagram showing an operation table of an automatic transmission 20;

FIG. 5 is an explanatory diagram showing states of temporal change in a target gear stage, an engine torque, an input shaft rotation speed Nin, an output torque, and a hydraulic pressure command.

DETAILED DESCRIPTION OF EMBODIMENTS

Next, best modes for carrying out the present invention will be described below using an embodiment.

Figure 1:
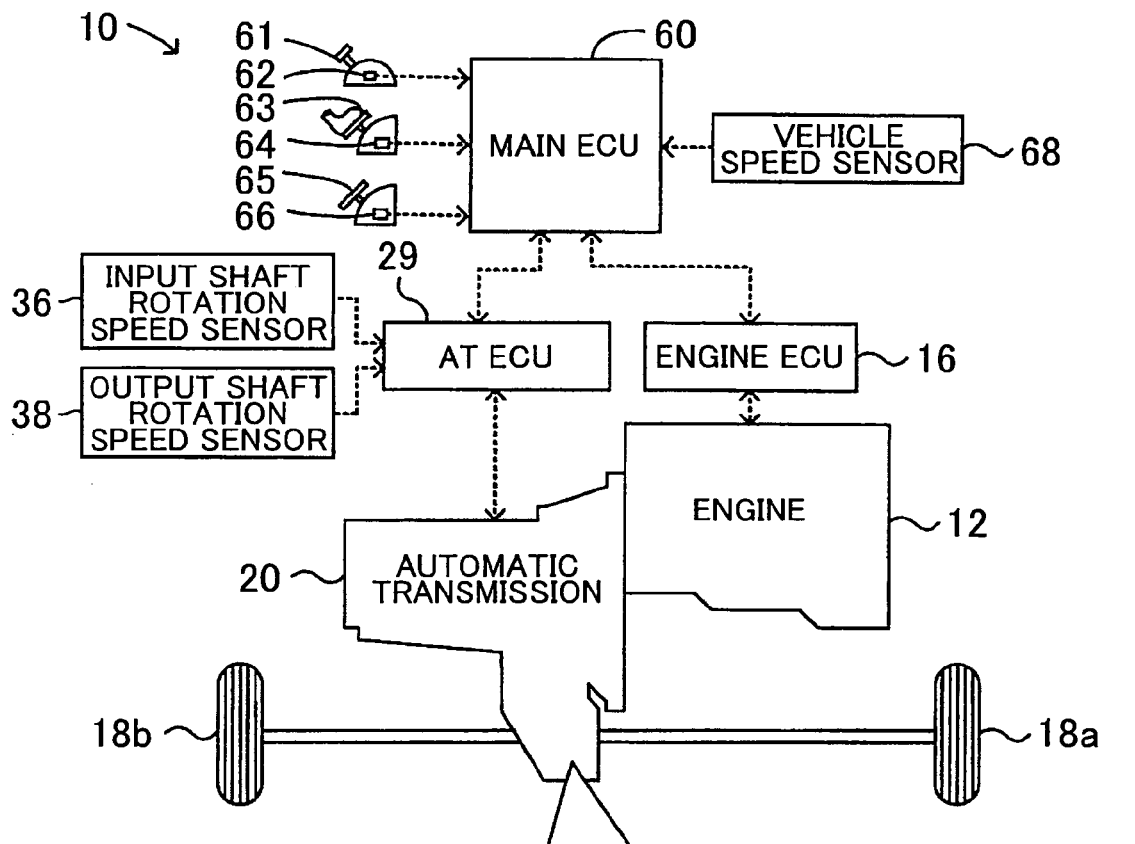
FIG. 1 is a structural diagram showing an outline of a structure of an automobile 10 including a power output device having a built-in transmission device according to an embodiment of the present invention.
Figure 1:
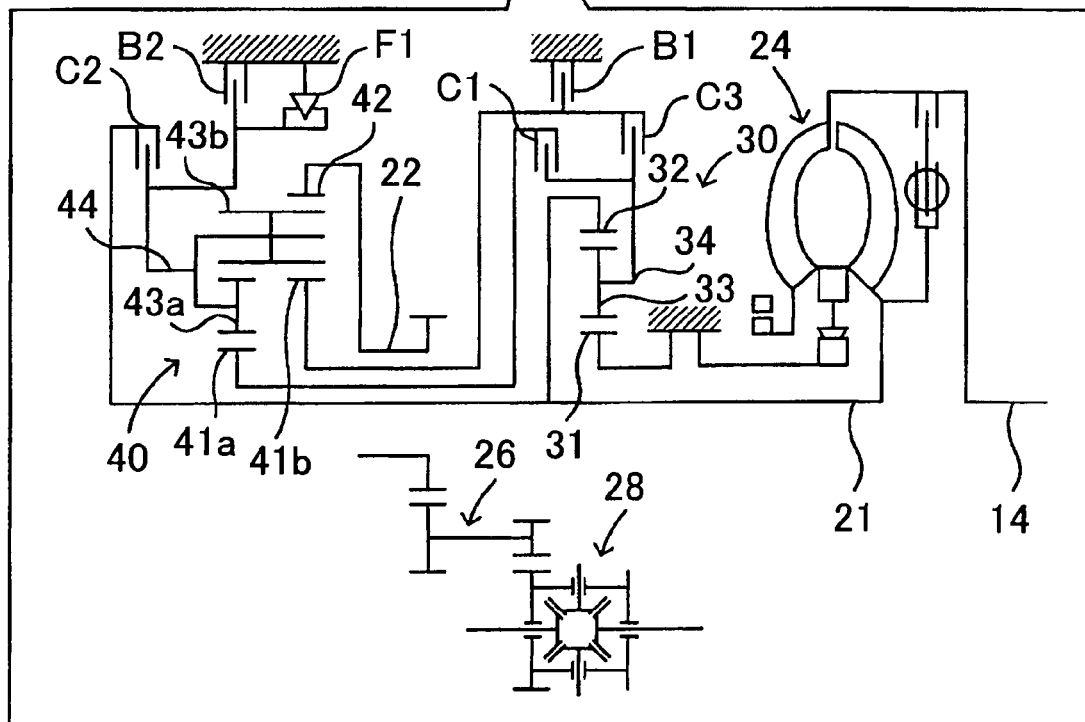
Figure 3:
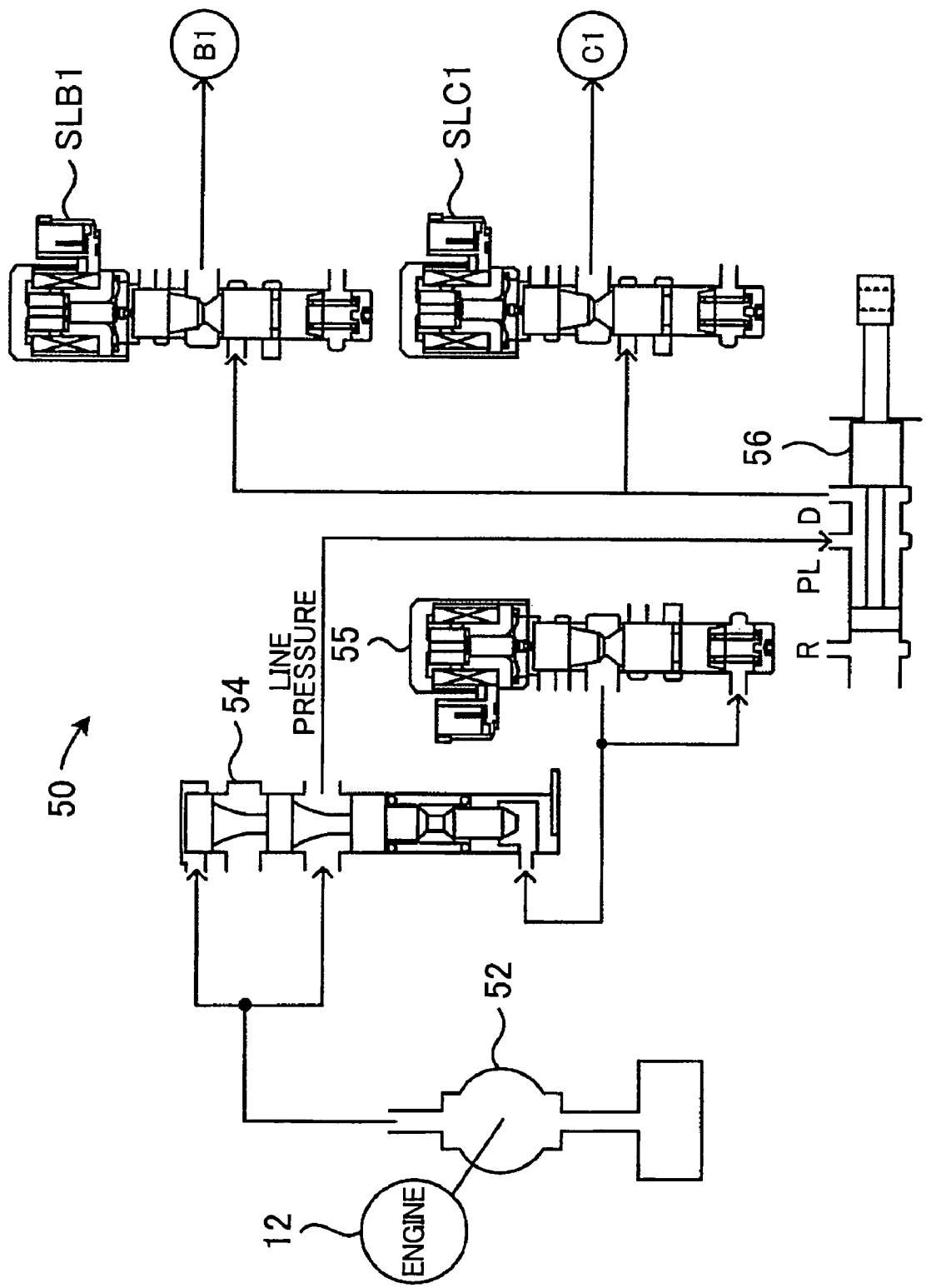
FIG. 3 is a structural diagram showing an outline of a structure of a hydraulic circuit 50.

FIG. 1 is a structural diagram showing an outline of a structure of an automobile 10 including a power output device having a built-in transmission device according to an embodiment of the present invention. FIG. 2 shows an operation table of an automatic transmission 20, and FIG. 3 is a structural diagram showing an outline of a structure of a hydraulic circuit 50 of the automatic transmission 20. As shown in FIG. 1, the automobile 10 of the embodiment includes an engine 12, a torque converter 24, the automatic transmission 20, and a main electronic control unit (hereinafter referred to as "main ECU") 60. The engine 12 serves as an internal combustion engine that produces power by explosive combustion of hydrocarbon-based fuel such as gasoline or diesel oil, and the torque converter 24 is provided with lockup clutch mounted on a crankshaft 14 of the engine 12. The automatic transmission 20 serves as a stepped automatic transmission that has an input shaft 21 connected to the output side of the torque converter 24 and an output shaft 22 connected to drive wheels 18a and 18b through a gear mechanism 26 and a differential gear 28, and transmits the power supplied to the input shaft 21 to the output shaft 22 at a changed speed. The main ECU 60 controls the entire power output device.

The operation of the engine 12 is controlled by an electronic control unit for engine (hereinafter referred to as "engine ECU") 16. The engine ECU 16, which is not shown in detail in the drawing, is structured as a microprocessor that is mainly composed of a CPU and provided with a ROM that stores processing programs, a RAM that temporarily stores data, an input port, an output port, and a communication port, in addition to the CPU. Signals required for controlling the operation of the engine 12 are fed via the input port into the engine ECU 16 from various sensors such as a rotation speed sensor mounted on the crankshaft 14, and signals such as drive signals to a throttle motor that regulates a throttle opening, control signals to a fuel injection valve, and ignition signals to spark plugs are sent out from the engine ECU 16 via the output port. The engine ECU 16 communicates with the main ECU 60, thereby controlling the engine 12 based on control signals from the main ECU 60, or sending data related to the operational state of the engine 12 to the main ECU 60 as required.

The automatic transmission 20 is structured as a six-speed stepped automatic transmission, having a single-pinion type planetary gear mechanism 30, a Ravigneaux type planetary gear mechanism 40, three clutches C1, C2, and C3, two brakes B1 and B2, and a one-way clutch F1. The single-pinion type planetary gear mechanism 30 is provided with a sun gear 31 serving as an external gear, a ring gear 32 serving as an internal gear arranged in a manner concentric with the sun gear 31, a plurality of pinion gears 33 meshing with both the sun gear 31 and the ring gear 32, and a carrier 34 holding the plurality of pinion gears 33 in a rotatable and revolvable manner. The sun gear 31 is fixed to a case, and the ring gear 32 is connected to the input shaft 21. The Ravigneaux type planetary gear mechanism 40 is provided with two sun gears 41a and 41b which are external gears, a ring gear 42 which is an internal gear, a plurality of short pinion gears 43a meshing with the sun gear 41a, a plurality of long pinion gears 43b meshing with the sun gear 41b and the plurality of short pinion gears 43a and also with the ring gear 42, and provided also with a carrier 44 that connects the plurality of short pinion gears 43a with the plurality of long pinion gears 43b and holds the short pinion gears 43a and the long pinion gears 43b together in a rotatable and revolvable manner. The sun gear 41a is connected to the carrier 34 of the single-pinion type planetary gear mechanism 30 through the clutch C1. The sun gear 41b is connected to the carrier 34 through the clutch C3 and also to the case through the brake B1. The ring gear 42 is connected to the output shaft 22. The carrier 44 is connected to the input shaft 21 through the clutch C2. In addition, the carrier 44 is connected to the case through the brake B2 and also connected to the case through the one-way clutch F1.

The automatic transmission 20 structured as described above can perform switching among first to sixth forward speeds, a reverse speed, and a neutral position by combining on/off (where "on" corresponds to an engaged state and "off" to a disengaged state) of the clutches C1 to C3 and on/off of the brakes B1 and B2, as shown in FIG. 2. The neutral state can be established by switching off the clutches C1 to C3, and the brakes B1 and B2. The first forward speed state can be established by switching on the clutch C1 while switching off the clutches C2 and C3 and the brakes B1 and B2. In this state, the power supplied from the input shaft 21 to the ring gear 32 of the single-pinion type planetary gear mechanism 30 is transmitted through the carrier 34 and the clutch C1 to the sun gear 41a of the Ravigneaux type planetary gear mechanism 40 at a reduced speed because the sun gear 31 is fixed and receives the reaction force, and the power supplied to the sun gear 41a is transmitted through the ring gear 42 to the output shaft 22 at a reduced speed because the carrier 44 is fixed by the one-way clutch F1 and receives the reaction force. Therefore, the power supplied to the input shaft 21 is transmitted to the output shaft 22 at a speed reduced by a comparatively large reduction ratio. In the first forward speed state, when engine brake is in operation, the carrier 44 is fixed by switching on the brake B2 instead of the one-way clutch F1. The second forward speed state can be established by switching on the clutch C1 and the brake B1 while switching off the clutches C2 and C3 and the brake B2. In this state, the power supplied from the input shaft 21 to the ring gear 32 of the single-pinion type planetary gear mechanism 30 is transmitted through the carrier 34 and the clutch C1 to the sun gear 41a of the Ravigneaux type planetary gear mechanism 40 at a reduced speed because the sun gear 31 is fixed and receives the reaction force, and the power supplied to the sun gear 41a is transmitted through the ring gear 42 to the output shaft 22 at a reduced speed because the sun gear 41b is fixed by the brake B1 and receives the reaction force. Therefore, the power supplied to the input shaft 21 is transmitted to the output shaft 22 at a speed reduced by a smaller reduction ratio than that of the first forward speed. The third forward speed state can be established by switching on the clutches C1 and C3 while switching off the clutch C2 and the brakes B1 and B2. In this state, the power supplied from the input shaft 21 to the ring gear 32 of the single-pinion type planetary gear mechanism 30 is transmitted through the carrier 34 and the clutch C1 to the sun gear 41a of the Ravigneaux type planetary gear mechanism 40 at a reduced speed because the sun gear 31 is fixed and receives the reaction force, and the power supplied to the sun gear 41a is transmitted through the ring gear 42 to the output shaft 22 at an equal speed because the Ravigneaux type planetary gear mechanism 40 integrally rotates due to switching on of the clutches C1 and C3. Therefore, the power supplied to the input shaft 21 is transmitted to the output shaft 22 at a speed reduced by a smaller reduction ratio than that of the second forward speed. The fourth forward speed state can be established by switching on the clutches C1 and C2 while switching off the clutch C3 and the brakes B1 and B2. In this state, the power supplied from the input shaft 21 to the ring gear 32 of the single-pinion type planetary gear mechanism 30 is transmitted through the carrier 34 and the clutch C1 to the sun gear 41a of the Ravigneaux type planetary gear mechanism 40 at a reduced speed because the sun gear 31 is fixed and receives the reaction force, and on the other hand, power is also directly transmitted from the input shaft 21 through the clutch C2 to the carrier 44 of the Ravigneaux type planetary gear mechanism 40, thereby determining the driving state of the ring gear 42, that is, the output shaft 22. Therefore, the power supplied to the input shaft 21 is transmitted to the output shaft 22 at a speed reduced by a smaller reduction ratio than that of the third forward speed. The fifth forward speed state can be established by switching on the clutches C2 and C3 while switching off the clutch C1 and the brakes B1 and B2. In this state, the power supplied from the input shaft 21 to the ring gear 32 of the single-pinion type planetary gear mechanism 30 is transmitted through the carrier 34 and the clutch C3 to the sun gear 41b of the Ravigneaux type planetary gear mechanism 40 at a reduced speed because the sun gear 31 is fixed and receives the reaction force, and on the other hand, power is also directly transmitted from the input shaft 21 through the clutch C2 to the carrier 44 of the Ravigneaux type planetary gear mechanism 40, thereby determining the driving state of the ring gear 42, that is, the output shaft 22. Therefore, the power supplied to the input shaft 21 is transmitted to the output shaft 22 at an increased speed. The sixth forward speed state can be established by switching on the clutch C2 and the brake B1 while switching off the clutches C1 and C3 and the brake B2. In this state, the power supplied from the input shaft 21 through the clutch C2 to the carrier 44 of the Ravigneaux type planetary gear mechanism 40 is transmitted through the ring gear 42 to the output shaft 22 at an increased speed because the sun gear 41b is fixed by the brake B1 and receives the reaction force. Therefore, the power supplied to the input shaft 21 is transmitted to the output shaft 22 at a speed increased by a smaller reduction ratio than that of the fifth forward speed. The first reverse speed state can be established by switching on the clutch C3 and the brake B2 while switching off the clutches C1 and C2 and the brake B1. In this state, the power supplied from the input shaft 21 to the ring gear 32 of the single-pinion type planetary gear mechanism 30 is transmitted through the carrier 34 and the clutch C3 to the sun gear 41b of the Ravigneaux type planetary gear mechanism 40 at a reduced speed because the sun gear 31 is fixed and receives the reaction force, and the power supplied to the sun gear 41b is transmitted through the ring gear 42 to the output shaft 22 as a reverse rotation because the carrier 44 is fixed by the brake B2 and receives the reaction force. Therefore, the power supplied to the input shaft 21 is transmitted to the output shaft 22 as a reverse rotational power at a speed reduced by a comparatively small reduction ratio.

The clutches C1 to C3, and the brakes B1 and B2 of the automatic transmission 20 are switched on and off by the hydraulic circuit 50 partially shown in FIG. 3. As shown in the drawing, the hydraulic circuit 50 is composed of components such as a mechanical oil pump 52 that feeds hydraulic oil under pressure by using power from the engine 12, a regulator valve 54 that regulates the pressure (line pressure PL) of the hydraulic oil that is pressure-fed by the mechanical oil pump 52, a linear solenoid 55 that drives the regulator valve 54, a linear solenoid SLC1 that introduces the line pressure PL through a manual valve 56 and, after regulating the pressure, provides the regulated pressure to the clutch C1, and a linear solenoid SLB1 that introduces the line pressure PL through the manual valve 56 and, after regulating the pressure, provides the regulated pressure to the brake B1 in the same manner as the linear solenoid SLC1. Note that although FIG. 3 shows only a hydraulic system for the clutch C1 and the brake B1, similar hydraulic systems can be structured for other elements such as the clutches C2 and C3 and the brake B2.

The automatic transmission 20 (hydraulic circuit 50) is drive-controlled by an electronic control unit for automatic transmission (hereinafter called "AT ECU") 29. The AT ECU 29, which is not shown in detail in the drawing, is structured as a microprocessor that is mainly composed of a CPU and provided with a ROM that stores processing programs, a RAM that temporarily stores data, an input port, an output port, and a communication port, in addition to the CPU. Signals such as an input shaft rotation speed Nin from a rotation speed sensor mounted on the input shaft 21 and an output shaft rotation speed Nout from a rotation speed sensor mounted on the output shaft 22 are fed into the AT ECU 29 via the input port, and signals such as drive signals to the linear solenoid 55, the linear solenoid SLC1, and the linear solenoid SLB1 are sent out from the AT ECU 29 via the output port. The AT ECU 29 communicates with the main ECU 60, thereby controlling the automatic transmission 20 (hydraulic circuit 50) based on control signals from the main ECU 60, or sending data related to the state of the automatic transmission 20 to the main ECU 60 as required.

The main ECU 60, which is not shown in detail in the drawing, is structured as a microprocessor that is mainly composed of a CPU and provided with a ROM that stores processing programs, a RAM that temporarily stores data, an input port, an output port, and a communication port, in addition to the CPU. Signals such as a shift position SP from a shift position sensor 62 that detects an operating position of a shift lever 61, an accelerator opening Acc from an accelerator pedal position sensor 64 that detects a depression amount of an accelerator pedal 63, a brake switch signal BSW from a brake switch 66 that detects a depression amount of a brake pedal 65, and a vehicle speed V from a vehicle speed sensor 68 are fed into the main ECU 60 via the input port. As described above, the main ECU 60 is connected to the engine ECU 16 and the AT ECU 29 via the communication port, through which various control signals and data are exchanged with the engine ECU 16 and the AT ECU 29.

Here, the engine 12, the engine ECU 16, the automatic transmission 20, the AT ECU 29, and the main ECU 60 correspond to the power output device of the embodiment, and the automatic transmission 20 and the AT ECU 29 correspond to the transmission device of the embodiment.

Figure 4:
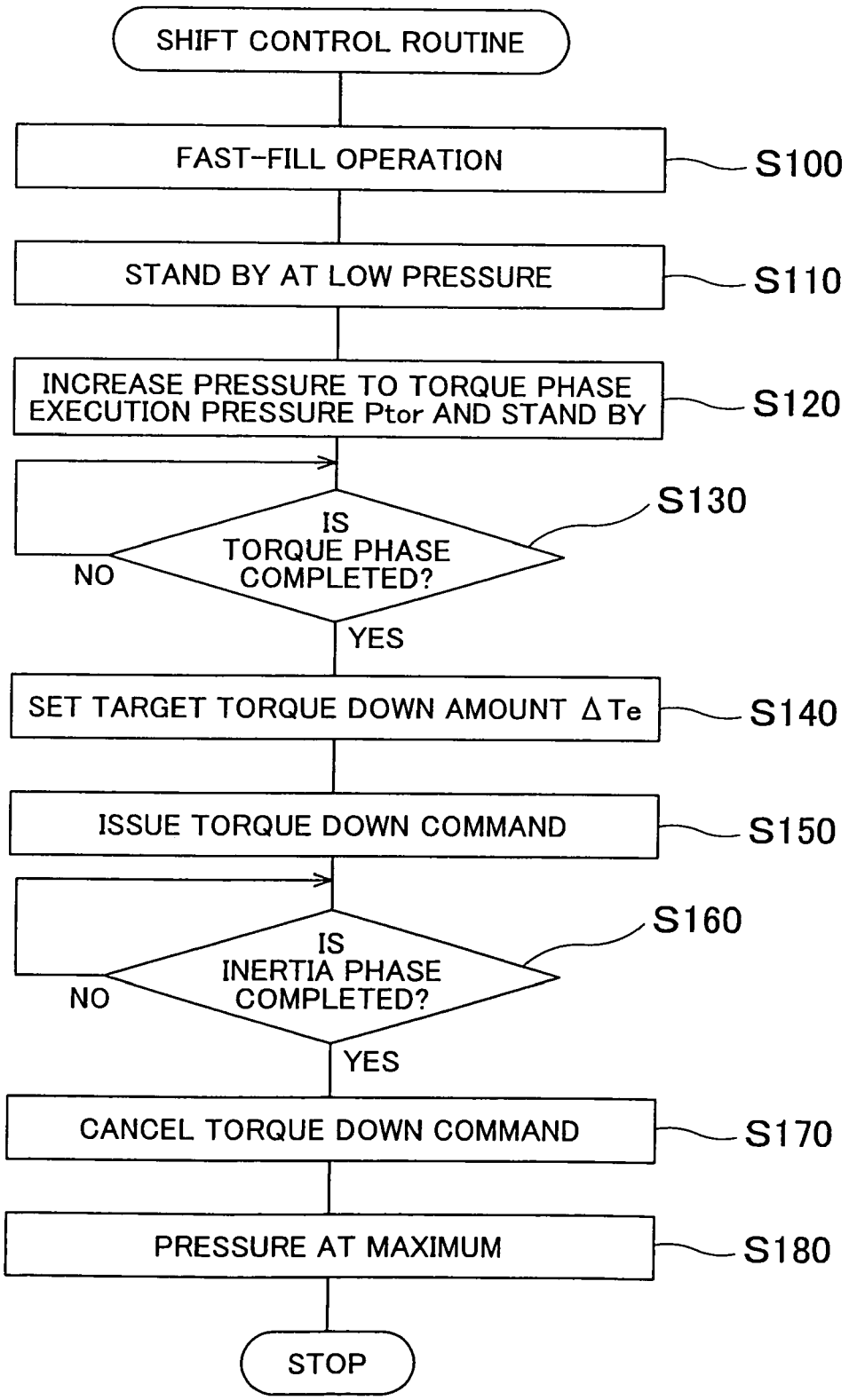
FIG. 4 is a flow chart showing an example of a shift control routine executed by an AT ECU 29 of the embodiment.

Next, the operation of the power output device of the embodiment provided in the automobile 10 structured as described above, particularly, the operation thereof when changing the shift speed of the automatic transmission 20 will be described below. FIG. 4 is a flow chart showing an example of a shift control routine executed by the AT ECU 29. This routine is executed when an upshift is commanded. Note that the command for the upshift is issued by the main ECU 60 to the AT ECU 29 based on the signals such as the accelerator opening Acc from the accelerator pedal position sensor 64 and the vehicle speed V from the vehicle speed sensor 68. Description will be made below regarding the shift control routine shown in FIG. 4, taking the case in which a command is issued to upshift from the first forward speed to the second forward speed, and in response, the brake B1 is switched on. Note that the cases of upshift from the second to the third forward speed, upshift from the third to the fourth forward speed, upshift from the fourth to the fifth forward speed, and upshift from the fifth to the sixth forward speed differ from the case of upshift from the first to the second forward speed only in that the former four cases include a process to switch off the clutch or the brake that has been kept on, and the other processes are the same as those of the upshift from the first to the second forward speed.

When the shift control routine is executed, the CPU of the AT ECU 29 first performs a fast-fill operation to fill hydraulic oil rapidly for closing a clearance between a piston and a friction plate, which are not shown, of the clutch or the brake to be switched on (step S100), and enters the state of standing by at a low pressure (step S110). In the case of upshift from the first to the second forward speed, the fast-fill operation is performed by driving the linear solenoid SLB1 with a comparatively high duty ratio so that the hydraulic oil is fed to the brake B1. Note that when switching off the clutch or the brake that has been kept on along with the change of the shift speed, a draining process is also performed to drain the hydraulic pressure applied to the clutch or the brake.

Subsequently, the CPU issues a hydraulic pressure command to increase the pressure in a stepwise manner up to a predetermined torque phase execution pressure Ptor to apply hydraulic pressure to the clutch or the brake to be switched on, and enters the state of standing by (step S120). Then, the CPU waits until a torque phase is completed (step S130). Here, the torque phase is a state in which the clutch or the brake that receives the reaction force when transmitting the torque from the input shaft 21 is changed to that which corresponds to the shift speed after shifting while the rotation speed of the input shaft 21 is maintained at the rotation speed corresponding to the shift speed before shifting. An inertia phase is a state in which the rotation speed of the input shaft 21 is changed to the rotation speed corresponding to the shift speed after shifting. In the embodiment, the shift speed of the automatic transmission 20 is changed through two phases of the torque phase and the inertia phase. It is assumed that the predetermined torque phase execution pressure Ptor is set to a value obtained experimentally as a pressure greater than the necessary and sufficient hydraulic pressure to complete the torque phase and smaller than the necessary and sufficient hydraulic pressure to start the inertia phase. In addition, by experimentally obtaining in advance the time required from when the torque phase execution pressure Ptor is made to be applied to the clutch or the brake to be switched on until the torque phase is actually substantially completed, the completion of the torque phase can be determined based on the determination as to whether or not the above-described required time has elapsed.

When the torque phase is completed, the CPU sets a target torque down amount $\Delta Te$ serving as an amount by which an output torque from the engine 12 is to be reduced (step S140), and issues a torque down command with a value of the target torque down amount $\Delta Te$ that has been set (step S150). The torque down command is issued in such a manner that the torque down command is sent to the main ECU 60, and the main ECU 60 which has received the torque down command sends the torque down command to the engine ECU 16. The engine ECU 16 that has received the torque down command performs intake air volume regulating control, fuel injection control, and ignition control so that the engine torque is reduced by the target torque down amount $\Delta Te$. Note that if the determination in step S130 as to whether the torque phase is completed is made at a timing earlier by a response time of the engine 12, and then the torque down command is issued, the torque down of the engine 12 can be performed at the timing when the torque phase is actually completed. Here, in the case of upshift from the first to the second forward speed, it is assumed that the target torque down amount $\Delta Te$ is set to a value obtained experimentally as a torque down amount required to start the inertia phase by reducing the torque of the engine 12 in the exact state in which the brake B1 receives the reaction force of the torque from the engine 12 after the torque phase is completed. As described above, the inertia phase is started by the torque down of the engine 12 in the state in which the hydraulic pressure of the clutch or the brake to be switched on is held at the torque phase execution pressure Ptor. This is because it is difficult to regulate the clutch pressure (brake pressure) with a high degree of accuracy due to the mechanism of the clutch (brake). Accordingly, if the inertia phase is started by increasing the hydraulic pressure to the clutch or the brake to be switched on, a shift shock may occur due to rapid engagement. However, if the hydraulic pressure is increased slowly in order to suppress the shift shock, shift response deteriorates.

After the inertia phase is started, the CPU waits until the inertia phase is completed (S160). The completion of the inertia phase can be determined in such a manner that the current gear ratio (reduction ratio) is calculated by dividing the input shaft rotation speed Nin from an input shaft rotation speed sensor 36 by the output shaft rotation speed Nout from an output shaft rotation speed sensor 38, and then it is determined whether or not the calculated gear ratio substantially coincides with the gear ratio of a target gear stage. When the inertia phase is completed, the CPU cancels the torque down command that has been sent to the engine ECU 16 through the main ECU 60 (step S170), and terminates this routine after increasing the hydraulic pressure, which is applied to the clutch or the brake to be switched on, to a maximum (step S180).

FIG. 5 is an explanatory diagram showing states of temporal change in the target gear stage, the engine torque, the input shaft rotation speed Nin, the output torque, and the hydraulic pressure command for the brake B1. Note that the dashed lines in the drawing show states of temporal change in the engine torque, the input shaft rotation speed Nin, the output torque, and the hydraulic pressure command in a comparative example. In the embodiment, as shown in the drawing, when the change of shift speed from the first to the second forward speed is commanded at time t1, the fast-fill operation is performed, and then at time t2, the torque phase is executed by standing by with the torque phase execution pressure Ptor applied to the brake B1. When the torque phase is completed at time t3, the torque down of the engine 12 is performed by the target torque down amount ΔTe. As a result, the inertia phase is started, and the rotation speed of the input shaft 21 (input shaft rotation speed Nin) rapidly decreases to a rotation speed corresponding to the second forward speed. When the input shaft rotation speed Nin reaches the rotation speed corresponding to the second forward speed and the inertia phase is completed at time t4, the torque down of the engine 12 is canceled, and the hydraulic pressure applied to the brake B2 is increased to a maximum. On the other hand, in the comparative example, as shown by the dashed lines in the drawing, the hydraulic pressure applied to the clutch or the brake to be switched on is gradually increased from the time t2, thereby executing the torque phase and also starting the inertia phase. Then, after the inertia phase is started, the torque down of the engine 12 is performed and the shift speed is changed. In this comparative example, the hydraulic pressure applied to the clutch or the brake to be switched on is slowly increased to change the shift speed so that the shift shock associated with engagement of the clutch or the brake does not occur. Thus, it is found that a longer time is required to change the shift speed than is required in the embodiment.

According to the power output device of the embodiment described above, when the change of shift speed is commanded in the state in which a torque is acting on the input shaft 21 of the automatic transmission 20 from the engine 12, the torque phase is executed by standing by with the torque phase execution pressure Ptor applied to the clutch or the brake to be switched on, and also the inertia phase is started by the torque down of the engine 12 in the state of standing by at the torque phase execution pressure Ptor, thereby changing the shift speed. As a result, the shift speed can be changed quickly while suppressing the shift shock, compared with the example in which the torque phase is executed and also the inertia phase is started by increasing the hydraulic pressure applied to the clutch or the brake to be switched on. In addition, because the hydraulic pressure applied to the clutch or the brake to be switched on is held at the torque phase execution pressure Ptor that is comparatively low while the inertia phase is executed, heat generation can be suppressed when the clutch or the brake is engaged.

In the power output device of the embodiment, the hydraulic pressure is applied to the clutch or the brake to be switched on by setting the hydraulic pressure command to increase the pressure in a stepwise manner up to the torque phase execution pressure Ptor when executing the torque phase. However, the present invention is not limited to this embodiment, and the hydraulic pressure command may be set so as to increase the pressure up to the torque phase execution pressure Ptor at a gradient.

In the power output device of the embodiment, the completion of the torque phase is determined based on the time elapsed after the torque phase execution pressure Ptor is applied. However, because the acceleration of the vehicle is reduced when the torque phase is completed, the completion of the torque phase may be determined by determining whether or not the acceleration of the vehicle has been reduced, based on the rotational acceleration of the input shaft 21 that is calculated on the basis of the input shaft rotation speed Nin obtained from the input shaft rotation speed sensor 36, or on the rotational acceleration of the output shaft 22 that is calculated on the basis of the output shaft rotation speed Nout obtained from the output shaft rotation speed sensor 38. In this case, because the reduction in the acceleration of the vehicle at the completion of the torque phase results in a smaller amount as the gear ratio (reduction ratio) of the target gear stage is smaller, it is desirable to perform this determination only in the case of shifting to the target gear stage of a comparatively high gear ratio, such as the upshift from the first to the second forward speed or the upshift from the second to the third forward speed.

In the power output device of the embodiment, the state of standing by continues from the start to the completion of the inertia phase while applying the torque phase execution pressure Ptor to the clutch or the brake to be switched on. However, after the inertia phase is started in the state of standing by at the torque phase execution pressure Ptor, a hydraulic pressure different from the torque phase execution pressure Ptor may be applied to the clutch or the brake to be switched on before the inertia phase is completed.

In the power output device of the embodiment, the six-speed automatic transmission 20 has been employed. However, the number of shift speeds is not limited to six, but may be two to five, or seven or more.

The embodiment has been described in the form of a power output device. However, the embodiment may be in the form of a control method of a power output device, or may be in the form of a transmission device.

Here, description will be made below regarding the correspondence between the main elements of the embodiment and the main elements described in the section of the disclosure of the invention. In the embodiment, the engine 12 corresponds to the "power source", the automatic transmission 20 corresponds to the "automatic transmission", the linear solenoid SLC1, the linear solenoid SLB1, or the like corresponds to the "engagement pressure regulating device", and the AT ECU 29 corresponds to the "control unit", where the AT ECU 29 executes the shift control routine shown in FIG. 4 in such a manner that, when the change of shift speed is commanded in the state in which a torque is acting on the input shaft 21 of the automatic transmission 20 from the engine 12, the torque phase is executed by standing by with the torque phase execution pressure Ptor applied to the clutch or the brake to be switched on, and also, when the torque phase is completed, the inertia phase is started by the torque down of the engine in the state of standing by at the torque phase execution pressure Ptor, thereby changing the shift speed. Here, the "power source" is not limited to the engine 12 serving as an internal combustion engine, but may be any type of power source, such as an electric motor, as far as the device functions as a power source. The "engagement pressure regulating device" is not limited to the linear solenoid SLC1, the linear solenoid SLB1, or the like that is structured as a linear solenoid for direct control capable of directly controlling the clutch (brake) by generating an optimal clutch pressure (brake pressure) from the line pressure, but may be any device as far as the device can regulate a fluid pressure applied to a friction engagement element, such as a device that controls the clutch (brake) by generating a clutch pressure (brake pressure) the line pressure by driving another control valve using a linear solenoid for pilot control. In addition, the "engagement pressure regulating device" is not limited to a device that uses hydraulic pressure to regulate the engagement pressure of the clutch or the brake, but may be a device that uses fluid pressure other than hydraulic pressure to regulate the engagement pressure of the clutch or the brake, or a device such as an electromagnetic clutch that uses electromagnetic force to regulate the engagement pressure of the clutch or the brake. Note that the correspondence between the main elements of the embodiment and the main elements described in the section of the disclosure of the invention does not limit the main elements described in the section of the disclosure of the invention, because the embodiment is an example for specifically explaining the best modes for carrying out the invention described in the section of the disclosure of the invention. That is, the interpretation of the invention described in the section of the disclosure of the invention should be made on the basis of the description in that section, and the embodiment is merely a specific example of the invention described in the section of the disclosure of the invention.

Although the best modes for carrying out the present invention have been described above using the embodiment, it is obvious that the present invention is not limited to the embodiment described above, but may be embodied in various forms without departing from the scope of the present invention.

The present invention can be used in the manufacturing industry of a transmission.

What is claimed is:

1. A transmission device that is built into a power output device outputting power to a drive shaft in combination with a power source and that includes an automatic transmission that changes a shift speed by switching an engagement state of at least one friction engagement element and transmits power from the power source to the drive shaft, the transmission device comprising:
    an engagement pressure regulating device that regulates an engagement pressure of the friction engagement element; and
    a control unit that controls the power source and the engagement pressure regulating device when a change of the shift speed is performed by engaging the friction engagement element in the state in which a torque is acting on an input shaft of the automatic transmission, so that the change of the shift speed is performed through two phases of a torque phase in which transmission of torque is changed to be made at the shift speed after shifting and an inertia phase in which a rotation speed of the input shaft is changed to a rotation speed corresponding to the shift speed after shifting, and controlling the power source and the engagement pressure regulating device so that the torque phase is executed by standing by with the friction engagement element engaged with a slip at a predetermined engagement pressure and the inertia phase is executed by reducing the torque acting on the input shaft from the power source in the state of standing by at the predetermined engagement pressure.

2. The transmission device according to claim 1, wherein the friction engagement element is an element driven by fluid pressure,
    the engagement pressure regulating device is a fluid pressure regulating device that regulates the fluid pressure to be applied to the friction engagement element, and
    the control unit is a unit that controls the power source and the fluid pressure regulating device so that the torque phase is executed by standing by with a predetermined fluid pressure serving as the predetermined engagement pressure applied to the friction engagement element, and the inertia phase is executed by reducing the torque acting on the input shaft from the power source in the state of standing by at the predetermined fluid pressure.

3. The transmission device according to claim 2, wherein the control unit is a unit that controls the fluid pressure regulating device by setting a fluid pressure command to increase the pressure up to the predetermined fluid pressure in a stepwise manner so as to execute the torque phase.

4. The transmission device according to claim 2, wherein the control unit is a unit that controls the fluid pressure regulating device so that the state of standing by at the predetermined fluid pressure is maintained until the inertia phase terminates.

5. The transmission device according to claim 2, wherein the predetermined fluid pressure is a fluid pressure at which the torque phase is completed but the inertia phase is not started.

6. The transmission device according to claim 2, wherein
    the transmission device is structured so as to transmit the torque from the power source to the drive shaft by using reaction force received by the friction engagement element, and
    the predetermined fluid pressure is a fluid pressure that is necessary and sufficient to receive the reaction force corresponding to the torque output from the power source.

7. The transmission device according to claim 2, wherein the control unit is a unit that performs control so as to determine completion of the torque phase and start the inertia phase by reducing the torque acting on the input shaft at the timing when the completion of the torque phase is determined.

8. The transmission device according to claim 7, wherein the control unit is a unit that determines the completion of the torque phase based on time elapsed after the control of the fluid pressure regulating device is started so that the predetermined fluid pressure is applied to the friction engagement element.

9. The transmission device according to claim 7, wherein the control unit is a unit that determines the completion of the torque phase based on a rotational acceleration of the input shaft of the automatic transmission or on a rotational acceleration of an output shaft of the automatic transmission.

10. A power output device outputting power to a drive shaft, the power output device comprising:
    a power source;
    an automatic transmission that has at least one friction engagement element and an engagement pressure regulating device that regulates an engagement pressure of the friction engagement element, and that changes a shift speed by switching the engagement state of the friction engagement element and transmits power from the power source to the drive shaft; and
    a control unit that performing control when a change of the shift speed is performed by engaging the friction engagement element in the state in which a torque is acting on an input shaft of the automatic transmission, so that the change of the shift speed is performed through two phases of a torque phase in which transmission of torque is changed to be made at the shift speed after shifting and an inertia phase in which a rotation speed of the input shaft is changed to a rotation speed corresponding to the shift speed after shifting, and controlling the engagement pressure regulating device so that the torque phase is executed by standing by with the friction engagement element engaged with a slip at a predetermined engagement pressure and also controlling the power source so that the inertia phase is executed by reducing the torque acting on the input shaft from the power source in the state of standing by at the predetermined engagement pressure.

11. A control method of a power output device including a power source and an automatic transmission that has at least one friction engagement element and an engagement pressure regulating device that regulates an engagement pressure of the friction engagement element, and that changes a shift speed by switching the engagement state of the friction engagement element and transmits power from the power source to a drive shaft, the control method of the power output device characterized by comprising:

performing control when a change of the shift speed is performed by engaging the friction engagement element in the state in which a torque is acting on an input shaft of the automatic transmission, so that the change of the shift speed is performed through two phases of a torque phase in which transmission of torque is changed to be made at the shift speed after shifting and an inertia phase in which a rotation speed of the input shaft is changed to a rotation speed corresponding to the shift speed after shifting; and controlling the engagement pressure regulating device so that the torque phase is executed by standing by with the friction engagement element engaged with a slip at a predetermined engagement pressure and also controlling the power source so that the inertia phase is executed by reducing the torque acting on the input shaft from the power source in the state of standing by at the predetermined engagement pressure.

* * * * *